US011867182B2

(12) United States Patent
Jia et al.

(10) Patent No.: US 11,867,182 B2
(45) Date of Patent: Jan. 9, 2024

(54) SCROLL COMPRESSOR

(71) Applicant: Emerson Climate Technologies (Suzhou) Co., Ltd., Jiangsu (CN)

(72) Inventors: Xiangmin Jia, Suzhou (CN); Yan Qin, Suzhou (CN); Xu Cheng, Suzhou (CN)

(73) Assignee: Copeland Climate Technologies (Suzhou) Co. Ltd., Jiangsu (CN)

( * ) Notice: Subject to any disclaimer, the term of this patent is extended or adjusted under 35 U.S.C. 154(b) by 0 days.

(21) Appl. No.: 17/791,382

(22) PCT Filed: Sep. 9, 2020

(86) PCT No.: PCT/CN2020/114167
§ 371 (c)(1),
(2) Date: Jul. 7, 2022

(87) PCT Pub. No.: WO2021/147337
PCT Pub. Date: Jul. 29, 2021

(65) Prior Publication Data
US 2023/0043328 A1 Feb. 9, 2023

(30) Foreign Application Priority Data
Jan. 21, 2020 (CN) .......................... 202020140896.4

(51) Int. Cl.
*F03C 2/00* (2006.01)
*F03C 4/00* (2006.01)
(Continued)

(52) U.S. Cl.
CPC .......... *F04C 29/06* (2013.01); *F04C 18/0215* (2013.01); *F04C 23/008* (2013.01); *F04C 29/0057* (2013.01); *F04C 2240/807* (2013.01)

(58) Field of Classification Search
CPC ................ F04C 18/0215; F04C 23/008; F04C 29/0021; F04C 29/0057; F04C 29/06; F04C 2240/807
See application file for complete search history.

(56) References Cited

U.S. PATENT DOCUMENTS

| 2001/0048886 A1 | 12/2001 | Kuroki et al. |
| 2015/0078945 A1* | 3/2015 | Su ........................ F04C 18/0215 418/55.1 |

(Continued)

FOREIGN PATENT DOCUMENTS

| CN | 102486174 A | 6/2012 |
| CN | 103477079 A | 12/2013 |

(Continued)

OTHER PUBLICATIONS

JP-11022661-A—Kuroiwa et al.—Slide Bush with Balance Weight and Scroll Type Fluid Machinery Using the same—Jan. 26, 1999—the English Machine Translation (Abstract) (Year: 1999).*

(Continued)

*Primary Examiner* — Theresa Trieu
(74) *Attorney, Agent, or Firm* — Harness, Dickey & Pierce, P.L.C.

(57) ABSTRACT

A scroll compressor includes: a rotary shaft; a compression mechanism including an orbiting scroll and a non-orbiting scroll, an extension portion of the orbiting scroll engaging with an eccentric structure of the rotary shaft via a bushing and a driving bearing having an axial height L1; and a counterweight located on the bushing, a mass center of the counterweight being located above an axial lower end of the driving bearing and having an axial distance L2 to the axial center of the driving bearing, and the ratio R of the axial distance L2 to the axial height L1 satisfying: 0.1≤R≤0.4. The scroll compressor can reduce the contact and wear between the bushing and the driving bearing and reduce the require- (Continued)

ments for the manufacturing precision and the mounting precision of components such as the counterweight and the bushing, achieving optimized system design.

20 Claims, 7 Drawing Sheets

(51) Int. Cl.
*F04C 2/00* (2006.01)
*F04C 18/00* (2006.01)
*F04C 29/06* (2006.01)
*F04C 18/02* (2006.01)
*F04C 29/00* (2006.01)
*F04C 23/00* (2006.01)

(56) References Cited

U.S. PATENT DOCUMENTS

| | | | | |
|---|---|---|---|---|
| 2019/0063436 | A1* | 2/2019 | Takamura | F04C 18/0215 |
| 2019/0301464 | A1* | 10/2019 | Kuma | F04C 18/0215 |
| 2020/0400143 | A1* | 12/2020 | Fukuhara | F04C 18/0215 |
| 2021/0324857 | A1 | 10/2021 | Kuma et al. | |

FOREIGN PATENT DOCUMENTS

| | | | | |
|---|---|---|---|---|
| CN | 208900359 U | | 5/2019 | |
| CN | 208900360 U | | 5/2019 | |
| CN | 209012065 U | | 6/2019 | |
| CN | 110319001 A | | 10/2019 | |
| EP | 2713053 A1 | | 4/2014 | |
| EP | 2913531 A1 | | 9/2015 | |
| JP | 11022661 A | * | 1/1999 | F04C 18/0215 |
| JP | 2001329967 A | | 11/2001 | |

OTHER PUBLICATIONS

International Search Report (English and Chinese) and Written Opinion of the International Searching Authority (Chinese) issued in PCT/CN2020/114167, dated Nov. 30, 2020; ISA/CN.

* cited by examiner

SCROLL COMPRESSOR

This application is the national phase of International Application No. PCT/CN2020/114167 titled "SCROLL COMPRESSOR" and filed on Sep. 9, 2020, which claims the priority to the Chinese patent application No. 202020140896.4, titled "SCROLL COMPRESSOR" and filed with the China National Intellectual Property Administration on Jan. 21, 2020, which is incorporated herein by reference in its entirety.

FIELD

The present application relates to a scroll compressor.

BACKGROUND

The contents of this section only provide background information related to the present application, which may not constitute the conventional technology.

In rotating machinery (such as a compressor, especially a scroll compressor), the movement of a moving component may be unbalanced during operation. For example, in the scroll compressor, a rotating shaft transmits power via an eccentric structure (such as an eccentric crank pin) of the rotating shaft through a bushing (such as an unloading bushing for providing radial compliance) and a driving bearing, so that an orbiting scroll orbits relative to a non-orbiting scroll. During the operation of the scroll compressor, due to the coupling of the orbiting scroll with the eccentric structure of the rotating shaft, a centrifugal force generated by the orbiting scroll in the movement process causes the problem of dynamic imbalance, and the scroll compressor is prone to vibration and noise.

Therefore, in the related technology, the scheme of providing a counterweight on the bushing is used to provide a reverse centrifugal force to balance the centrifugal force generated by the orbiting scroll, so as to solve the above problem of dynamic imbalance. In this design, since the counterweight is arranged on the bushing, the influence of the centrifugal force generated by the counterweight on the bushing should also be considered. If the design of the counterweight is unreasonable, it is easy to cause the bushing to be inclined relative to the driving bearing, so that the bushing is in inclined contact with the driving bearing, causing wear.

Therefore, there is still a need for reasonable design of the counterweight, so as to not only solve the above problem of dynamic imbalance, but also avoid the contact and wear between the bushing and the driving bearing.

SUMMARY

An object of the present application is to solve at least one of the above problems.

According to an aspect of the present application, a scroll compressor is provided. The scroll compressor includes: a rotating shaft, an end of which is provided with an eccentric structure; a compression mechanism, including a non-orbiting scroll and an orbiting scroll, where the orbiting scroll includes an extending portion which extends from an end plate toward the rotating shaft; a driving bearing, with an axial height $L1$; a bushing, where the extending portion is coupled with the eccentric structure via the driving bearing and the bushing, so that the rotating shaft is configured to drive the compression mechanism; and a counterweight, arranged on the bushing. A mass center of the counterweight is located above an axial lower end of the driving bearing, an axial distance from the mass center of the counterweight to an axial center of the driving bearing is $L2$, and a ratio $R$ of the axial distance $L2$ to the axial height $L1$ satisfies: $0.1 \leq R \leq 0.4$.

Preferably, the ratio $R$ satisfies: $0.1 \leq R \leq 0.2$.

The counterweight includes a mounting portion, a main counterweight portion and a connecting portion connecting the mounting portion with the main counterweight portion. The mounting portion is mounted to the bushing.

The scroll compressor further includes a thrust member, the orbiting scroll is supported on the thrust member, and the main counterweight portion is located in a space between the thrust member and the extending portion.

In an embodiment, the main counterweight portion is in an arc shape concentric with a rotation center of the rotating shaft, and an arc angle of the main counterweight portion ranges from 160° to 180°.

In an embodiment, at least a windward side circumferential end wall of the circumferential end walls of the counterweight is inclined in a direction opposite to a rotation direction of the counterweight, to form an inclination angle of less than 90° relative to a central axis of the counterweight.

In an embodiment, a mass center of the main counterweight portion is located above the axial center of the driving bearing.

In an embodiment, the counterweight further includes an auxiliary counterweight portion, and the auxiliary counterweight portion is located axially above or radially outside the main counterweight portion.

In an embodiment, the eccentric structure is an eccentric crank pin, the extending portion is a hub portion, and the eccentric crank pin is coupled in the hub portion via the bushing and the driving bearing.

In an embodiment, the bushing is an unloading bushing, which is arranged to be driven by the eccentric structure and adapted to be displaced relative to the eccentric structure to realize radial compliance of the compression mechanism.

In an embodiment, the eccentric structure is an eccentric recess portion, the extending portion is a protruding shaft portion, and the protruding shaft portion is coupled in the eccentric recess portion via the driving bearing and the bushing.

The mass center of the counterweight may be located below or above the axial center of the driving bearing.

The improved scroll compressor is provided according to the present application. In the scroll compressor according to the present application, by means of the reasonable design of the structure and parameters of the counterweight, the centrifugal force of the orbiting scroll can be offset, and meanwhile, considering the limitation of the installation space in the scroll compressor, in the case where the unloading bushing is allowed to have a certain degree of inclination relative to the driving bearing, the wear between the unloading bushing and the driving bearing is reduced, the requirements for the manufacturing accuracy and installation accuracy of the counterweight, the unloading bushing and other components can be lowered, and the system optimization design of the scroll compressor can be realized.

BRIEF DESCRIPTION OF THE DRAWINGS

Hereinafter, the embodiments of the present application are described by way of example with reference to the drawings. In the drawings, same features or components are denoted by the same reference numerals and the drawings may be not necessarily drawn to scale. In the drawings.

DETAILED DESCRIPTION OF THE EMBODIMENTS

The following description is essentially only illustrative, rather than intending to limit the present application and the application or usage thereof. It should be appreciated that, throughout all drawings, similar reference signs indicate the same or similar parts or features. Each drawing only schematically shows the concept and principle of the embodiments of the present application, and may not necessarily show the specific dimensions and proportions of the various embodiments of the present application. Specific parts in specific drawings may be exaggerated to illustrate related details or structures of the embodiments of the present application.

In the description of the embodiments of the present application, the orientation terms related to "upper" "lower", "left" and "right" and used herein are described according to the upper, lower, left and right position relationships of the views shown in the accompanying drawings. In practical applications, the positional relationships of "upper", "lower", "left" and "right" used herein may be defined according to practical conditions. These relationships may be reversed.

Figure 1:
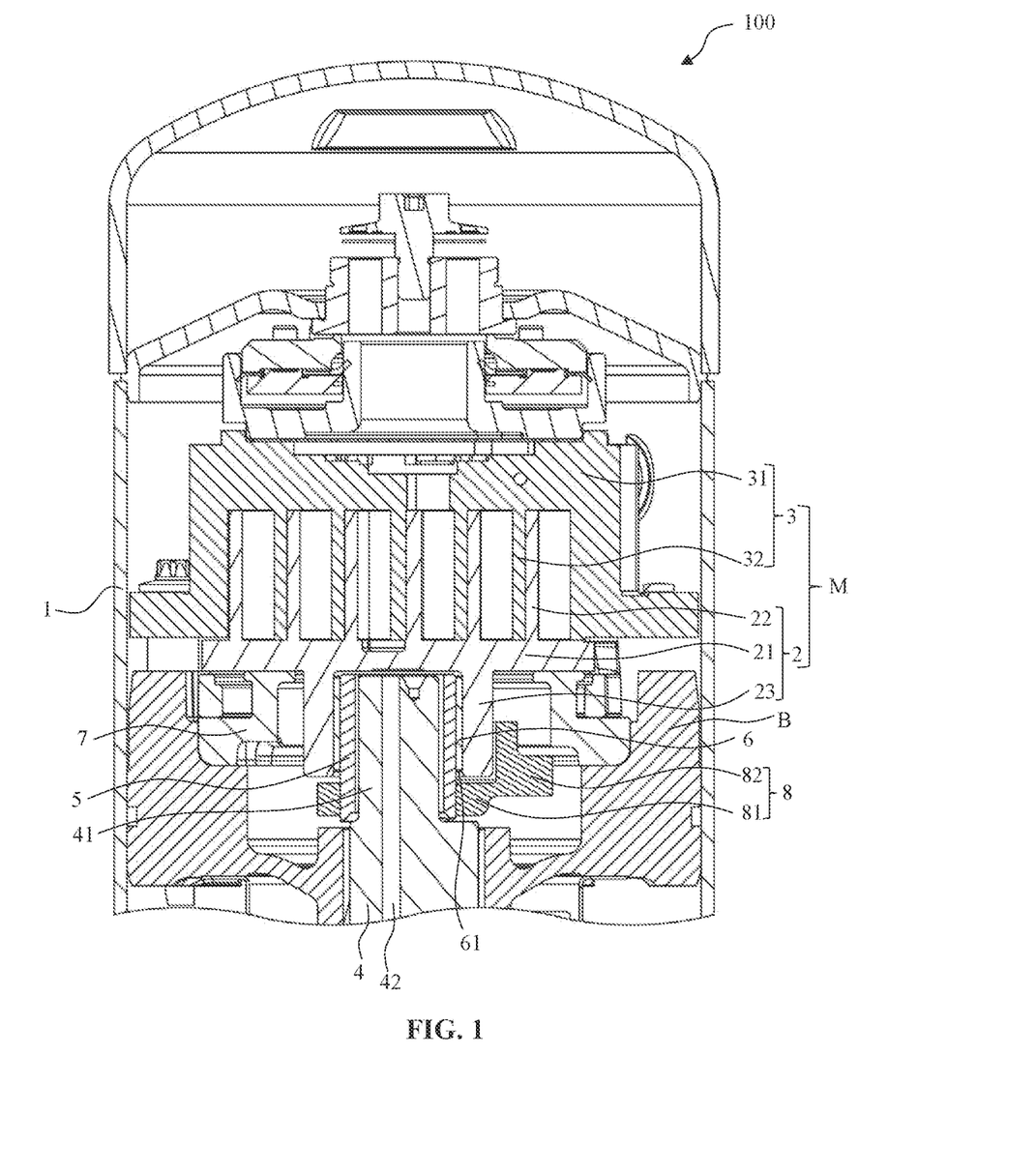
FIG. 1 is a partial cross-sectional view of a scroll compressor in the related technology.

FIG. 1 is a partial cross-sectional view of a scroll compressor 100 in the related technology. As shown in FIG. 1, the scroll compressor 100 includes a rotating shaft 4 and a compression mechanism M that are arranged in a housing 1. The compression mechanism M includes an orbiting scroll 2 and a non-orbiting scroll 3. The orbiting scroll 2 includes an end plate 21, a scroll 22 which extends from the end plate 21 toward a side (a side where the non-orbiting scroll 3 is located) and a hub portion 23 which extends from the end plate 21 toward an opposite side (a side where the rotating shaft 4 is located). The non-orbiting scroll 3 includes an end plate 31 and a scroll 32 which extends from the end plate 31 toward a side (a side where the orbiting scroll 3 is located). During the operation of the scroll compressor 100, the scroll 22 of the orbiting scroll 2 and the scroll 32 of the non-orbiting scroll 3 engage with each other and form a series of compression chambers therebetween. The orbiting scroll 2 is supported on a main bearing housing B via a thrust member 7. The thrust member 7 may be a separate member or a part of the main bearing housing B. An eccentric structure of the rotating shaft 4 is coupled with an extending portion of the orbiting scroll 2 to transmit power to the orbiting scroll 2.

Specifically, in the illustrated scroll compressor 100, the eccentric structure of the rotating shaft 4 is an eccentric crank pin 41 located at the top of the rotating shaft 4, and the extending portion of the orbiting scroll 2 is a hub portion 23. As shown in FIG. 1, a bushing 5 is mounted on the eccentric crank pin 41, fitted and mounted inside a driving bearing 6, and the driving bearing 6 is mounted inside the hub portion 23 of the orbiting scroll 2. The eccentric crank pin 41 transmits the rotating power of the rotating shaft 4 to the orbiting scroll 2 via the bushing 5 and the driving bearing 6, so that the orbiting scroll 2 orbits relative to the non-orbiting scroll 3, so as to perform the compression in the series of compression chambers between the orbiting scroll 2 and the non-orbiting scroll 3. During this movement, lubricating oil in an oil sump (not shown) at the bottom of the housing of the scroll compressor 100 is delivered to each joint surface for lubrication through a lubricating oil passage 42 inside the rotating shaft 4, forming an oil film between the joint surfaces to avoid wear.

During the operation of the scroll compressor 100, a centrifugal force generated by the movement of the orbiting scroll 2 incurs the problem of dynamic imbalance due to the above eccentric arrangement between the orbiting scroll 2 and the rotating shaft 4, which is easy to cause excessive radial force between the scroll 22 of the orbiting scroll 2 and the scroll 32 of the non-orbiting scroll 3. Therefore, as shown in FIG. 1, a counterweight 8 is mounted on the bushing 5 to generate a reverse centrifugal force during the operation of the scroll compressor 100 to offset the centrifugal force generated by the orbiting scroll 2, so as to solve the above problem of dynamic imbalance.

Figure 2:
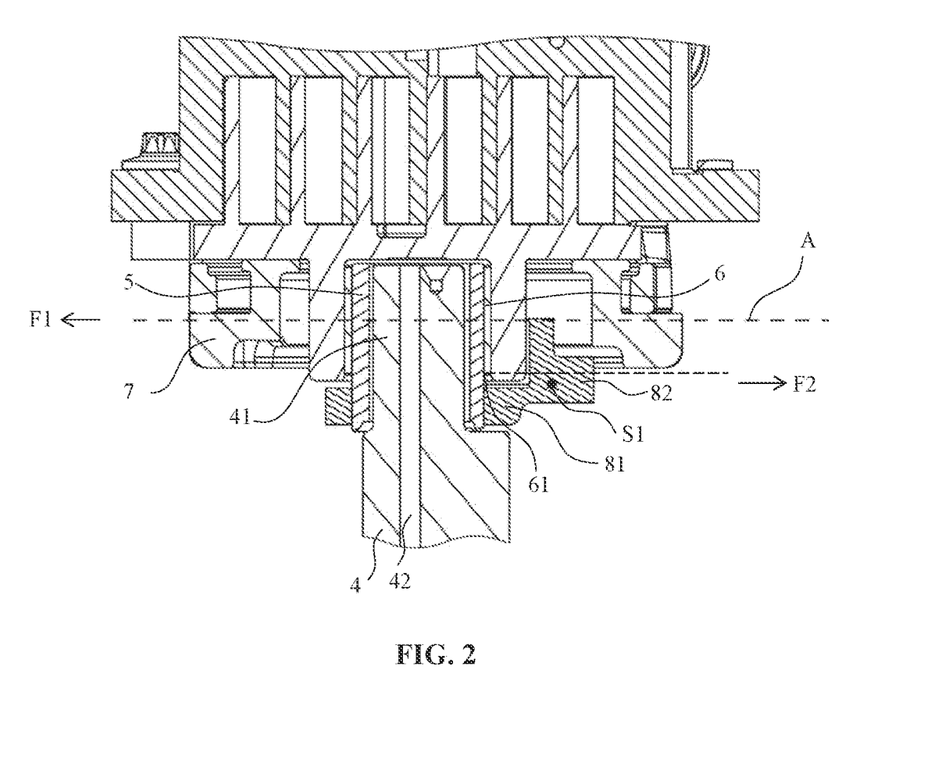
FIG. 2 is a partial enlarged view of FIG. 1.

FIG. 2 is a partial enlarged view of FIG. 1, which shows the mounting among the orbiting scroll 2, the bushing 5, the driving bearing 6 and the counterweight 8. The counterweight 8 includes an annular mounting portion 81 and a counterweight portion 82, and the counterweight portion 82 is only arranged on part of a circumference of the mounting portion 81. The counterweight portion 82 extends upward in an axial direction (in an up-down direction in FIG. 2) and outward in a radial direction (in a left-right direction in FIG. 2) from the mounting portion 81. The mounting portion 81 of the counterweight 8 is fixedly mounted on a lower end of the bushing 5, and the counterweight portion 82 is located on a radial outer side of the hub portion 23. During the operation of the scroll compressor 100, the orbiting scroll 2 generates a centrifugal force as shown by arrow F1 in FIG. 2, and the counterweight 8 generates a centrifugal force in an opposite direction, as shown by arrow F2 in FIG. 2, radially outward from a mass center S1 of the counterweight 8, so as to offset the centrifugal force generated by the orbiting scroll 2 and thus alleviate the above problem of dynamic imbalance.

The bushing 5 fits in the driving bearing 6, and action surfaces between the bushing 5 and the driving bearing 6 are fitting surfaces between them, that is, an outer peripheral surface, located inside the driving bearing 6, of the bushing 5 and an inner peripheral surface of the driving bearing 6. Therefore, an action point of the orbiting scroll 2 acting on the bushing 5 via the driving bearing 6 is substantially located at a height of an axial center of the inner peripheral surface of the driving bearing 6, as shown by the dotted line A in FIG. 2. However, as shown in FIG. 2, the mass center S1 of the counterweight 8 is located below an axial lower end 61 of the driving bearing 6 in an axial direction (in the up-down direction in FIG. 2). Therefore, the action point of the force acting on the bushing 5 by the orbiting scroll 2 via the driving bearing 6 is not at the same axial height as the action point of the force acting on the bushing 5 by the counterweight 8, which results in an overturning moment on the bushing 5, so that the bushing 5 is inclined in the driving bearing 6, and the bushing 5 is in inclined contact with the driving bearing 6, which destroys the oil film between the bushing 5 and the driving bearing 6, thereby causing wear.

The inventor is aware of the above problems and proposes a reasonable design of the counterweight, so that the problem of dynamic imbalance can be overcome by balancing the centrifugal force generated by the orbiting scroll by means of the counterweight, and the contact and wear between the bushing and the driving bearing can be avoided. The scroll compressor according to the present application is described below with reference to the accompanying drawings.

Figure 3:
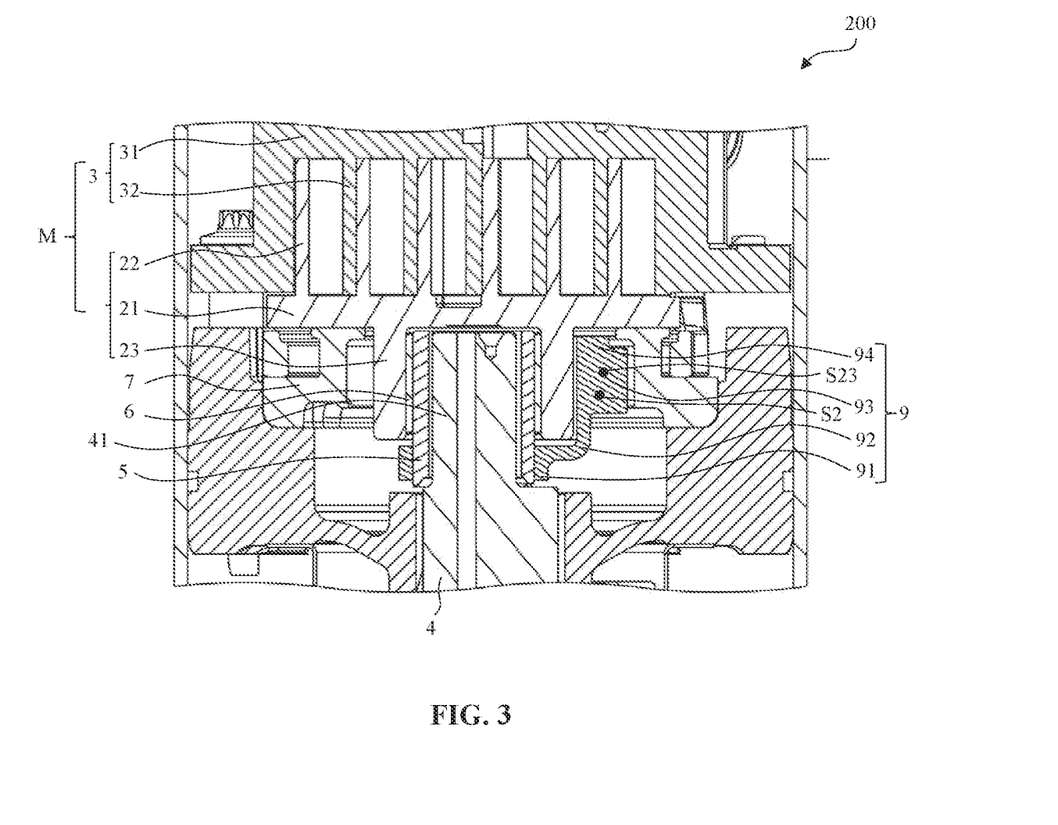
FIG. 3 is a partial cross-sectional view of a scroll compressor according to a first embodiment of the present application.

FIG. 3 is a partial cross-sectional view of a scroll compressor 200 according to a first embodiment of the present application. A structure of the scroll compressor 200 according to the first embodiment of the present application is substantially the same as that of the scroll compressor 100 in the above related technology, except for the design of the counterweight. In the drawings, the same components as those of the scroll compressor 100 are denoted by the same reference numerals, and will not be described again. Only the differences between the scroll compressor 200 according to the first embodiment of the present application and the scroll compressor 100 in the related technology are described below.

As shown in FIG. 3, an end of the rotating shaft 4 (an upper end in the figure) is provided with an eccentric structure, the orbiting scroll 2 includes an extending portion which extends from the end plate 21 toward the rotating shaft 4, and the extending portion is coupled with the eccentric structure of the rotating shaft 4. Specifically, in the embodiment, the eccentric structure is an eccentric crank pin 41 on the rotating shaft 4, and the extending portion of the orbiting scroll 2 is a hub portion 23. A bushing 5 is mounted on the eccentric crank pin 41, and the bushing 5 is fitted and mounted in the driving bearing 6. The bushing 5 may be an unloading bushing, which is driven by the eccentric crank pin 41 and adapted to be displaced relative to the eccentric crank pin 41 to realize radial compliance of the compression mechanism M. The power of the rotating shaft 4 is transmitted by the eccentric crank pin 41 to the orbiting scroll 2 via the bushing 5 and the driving bearing 6, so that the orbiting scroll 2 orbits relative to the non-orbiting scroll 3. A counterweight 9 is mounted on the bushing 5. During the operation of the scroll compressor 200, the counterweight 9 and the orbiting scroll 2 generate centrifugal forces in the opposite directions, so that the centrifugal force generated by the orbiting scroll 2 during the movement is offset by the centrifugal force generated by the counterweight 9.

Figure 4:
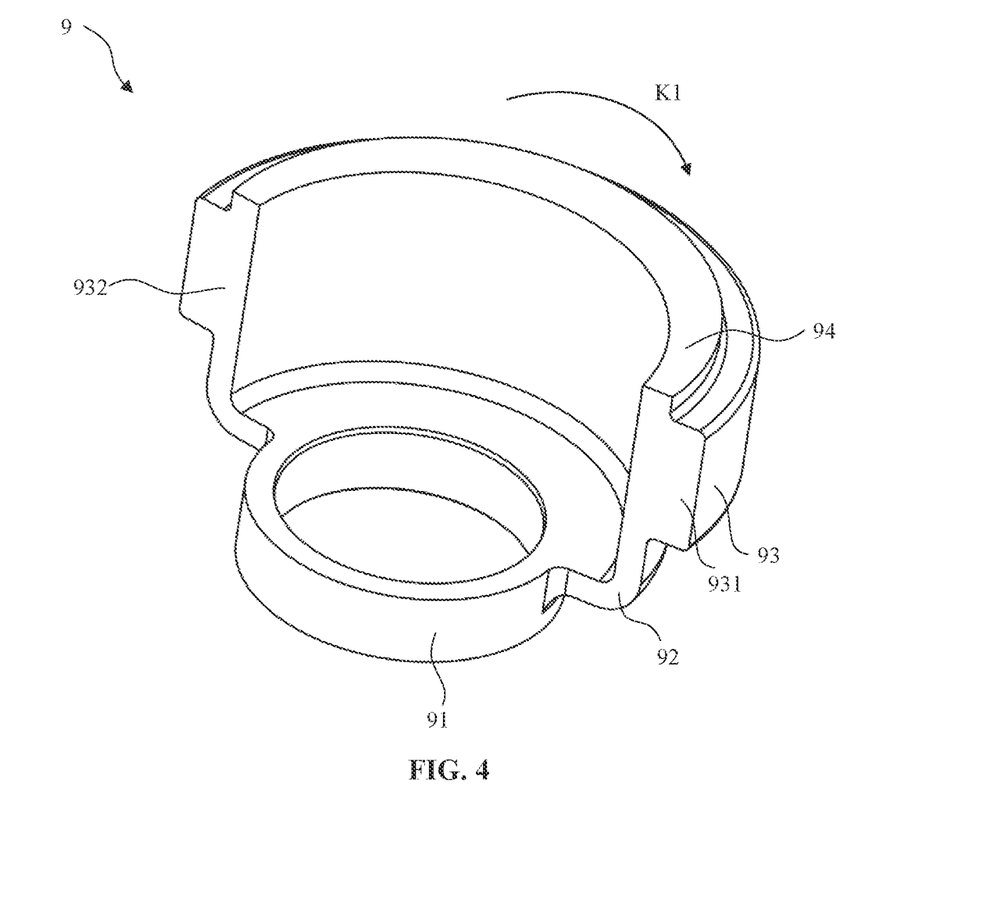
FIG. 4 is a perspective view of a counterweight of the scroll compressor in FIG. 3.
Figure 5:
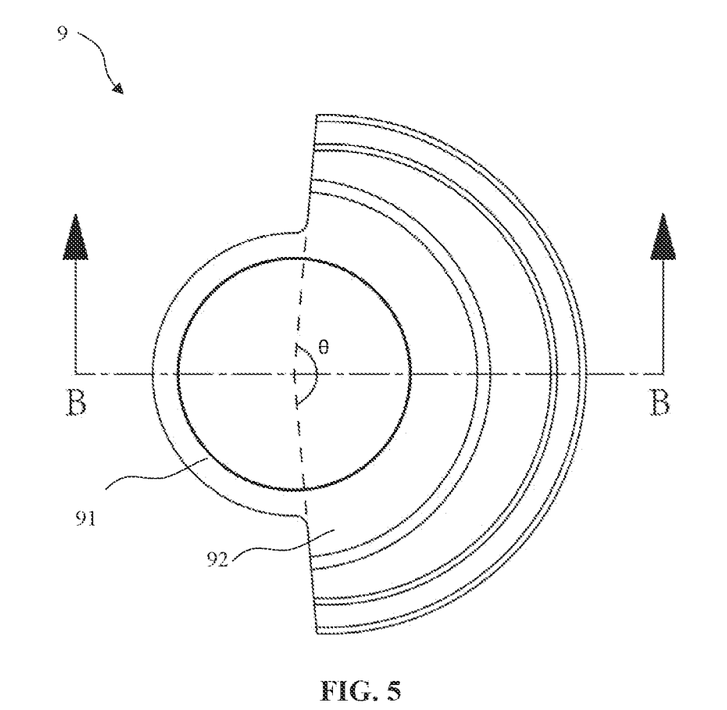
FIG. 5 is a top view of the counterweight in FIG. 4.
Figure 6:
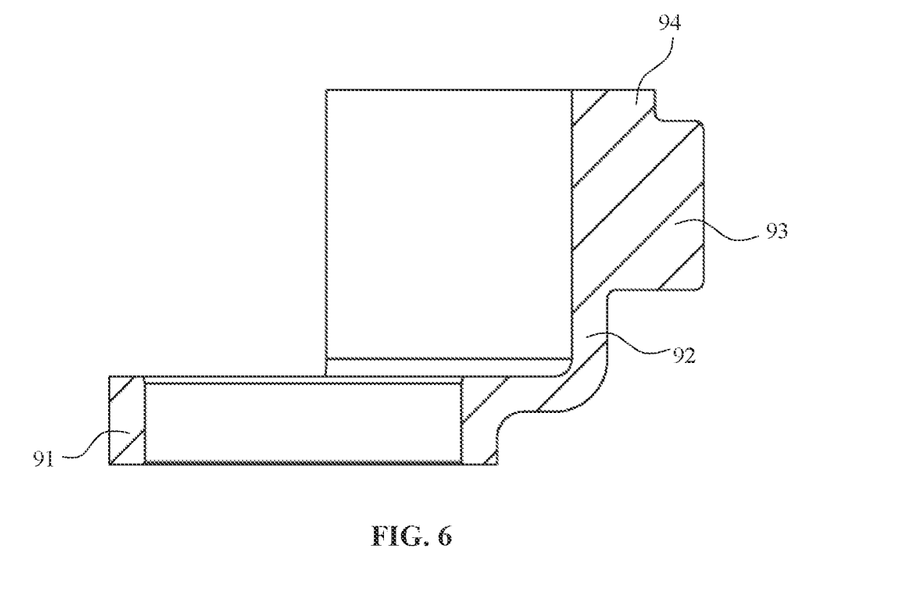
FIG. 6 is a cross-sectional view taken along a section line B-B in FIG. 5.

FIG. 4 is a perspective view of the counterweight 9, FIG. 5 is a top view of the counterweight 9, and FIG. 6 is a cross-sectional view taken along a section line B-B in FIG. 5. As shown in FIGS. 4 to 6, the counterweight 9 includes an annular mounting portion 91, a connecting portion 92, a main counterweight portion 93 and an auxiliary counterweight portion 94. The mounting portion 91 is to be mounted on the bushing 5. The connecting portion 92 extends axially upward and radially outward from the mounting portion 91 to the main counterweight portion 93, so as to connect the mounting portion 91 with the main counterweight portion 93. In the drawings, the connecting portion 92 has a cross-section in the shape of a corner, as shown in FIG. 6. However, the present application is not limited thereto, and the connecting portion 92 may have a cross-section in other shapes according to other examples of the present application. For example, the connecting portion 92 may obliquely extend from the mounting portion 91 to the main counterweight portion 93 without interfering with the hub portion 23. The main counterweight portion 93 is arc-shaped, is located above the mounting portion 91 in the axial direction (in the up-down direction in the figure), and is located outside the mounting portion 91 in the radial direction (in the left-right direction in the figure). When the counterweight 9 is mounted in place in the scroll compressor 200, the main counterweight portion 93 is concentric with a rotation center of the rotating shaft 4. An arc angle θ of the arc-shaped main counterweight portion 93 ranges from 160° to 180°, as shown in FIG. 5. Preferably, at least a windward side circumferential end wall of a circumferential end wall 931 and a circumferential end wall 932 of portions (including the connecting portion 92, the main counterweight portion 93 and the auxiliary counterweight portion 94) of the counterweight 9 other than the mounting portion 91 is inclined in the direction opposite to the rotation direction of the counterweight 9, and forms an inclination angle of less than 90° relative to the axial direction of the counterweight 9, so that the connecting portion 92, the main counterweight portion 93 and the auxiliary counterweight portion 94 are formed to taper from the connecting portion 92 toward the auxiliary counterweight portion 64, which is beneficial to stirring the lubricating oil to the thrust member 7 during the operation of the scroll compressor 200, so as to reduce the oil stirring work of the scroll compressor 200. The windward side circumferential end wall of the main counterweight portion 93 refers to a circumferential end wall located upstream in the rotation direction of the circumferential end wall 931 and the circumferential end wall 932 of the main counterweight portion 93 during the operation of the scroll compressor 200. For example, in a case that the counterweight 9 rotates in the direction shown by the arrow K1 in FIG. 4, the circumferential end wall 931 is the windward side circumferential end wall, and the circumferential end wall 931 is inclined in the direction opposite to the direction shown by the arrow K1 relative to the axial direction of the counterweight 9. The auxiliary counterweight portion 94 is located above the main counterweight portion 93 in the axial direction. In this embodiment, the mounting portion 91, the connecting portion 92, the main counterweight portion 93 and the auxiliary counterweight portion 94 are integrally formed. However, the present application is not limited thereto. According to other embodiment of the present application, the mounting portion 91, the connecting portion 92, the main counterweight portion 93 and the auxiliary counterweight portion 94 may be two or more components which are assembled with each other.

Referring back to FIG. 3, when the counterweight 9 is mounted in place, the mounting portion 91 is fixed at a lower end of the bushing 5, and the main counterweight portion 93 is located on a radial outer side of the hub portion 23 of the orbiting scroll 2, and is located axially above the lower end 61 of the driving bearing 6. In addition, as shown in FIG. 3, a mass center S23 of the main counterweight portion 93 is located above the height of the axial center of the driving bearing 6. Through the above arrangement, the mass center S2 of the counterweight 9 is located above the lower end 61 of the driving bearing 6 when the counterweight 9 is mounted in place, which can reduce the axial height difference between the action point of the force acting on the bushing 5 by the orbiting scroll 2 via the driving bearing 6 and the action point of the force acting on the bushing 5 by the counterweight 9, so as to effectively reduce the overturning moment that tilts the bushing 5.

Figure 7:
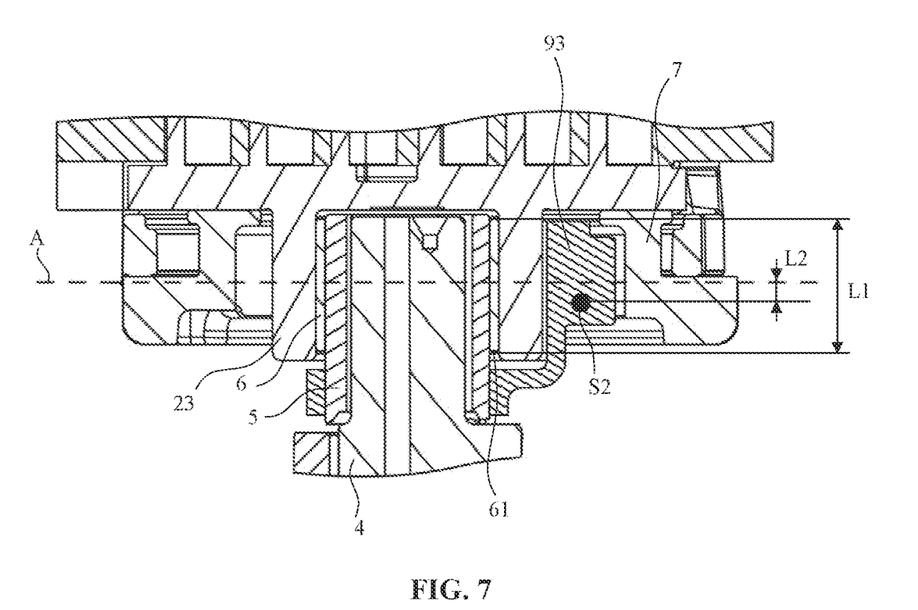
FIG. 7 is a partial enlarged view of FIG. 3.

FIG. 7 is a partial enlarged view of FIG. 3, which shows the mounting among the orbiting scroll 2, the bushing 5, the driving bearing 6 and the counterweight 9. As shown in FIG. 7, the axial height of the driving bearing 6 is L1, the axial distance between the mass center S2 of the counterweight 9 and the dotted line A is L2, and the dotted line A represents the height of the axial center of the driving bearing 6. In FIG. 7, the mass center S2 of the counterweight 9 is located below the dotted line A. However, the mass center S2 of the counterweight 9 may be located above the dotted line A, if only to avoid wear between the bushing 5 and the driving bearing 6. Preferably, the axial height difference between the action point of the force acting on the bushing 5 by the orbiting scroll 2 via the driving bearing 6 and the action point of the force acting on the bushing 5 by the counterweight 9 is as small as possible, that is, the mass center S2 of the counterweight 9 is as close to the height of the axial center of the driving bearing 6 as possible, or, the mass center S2 of the counterweight 9 is as close to the dotted line A as possible so that the axial distance L2 is as small as possible, which can reduce the overturning moment acting on the bushing 5 as much as possible. Preferably, the thickness of the mounting portion 91 and the connecting portion 92 of the counterweight 9 is arranged to be as small as possible while ensuring the required strength, so that the mass center S2 of the counterweight 9 is further moved up to approach the dotted line A. In the ideal case, the action point of the force acting on the bushing 5 by the orbiting scroll 2 has the same axial height as the action point of the force acting on the bushing 5 by the counterweight 9, that is, the mass center S2 of the counterweight 9 is substantially located on the dotted line A, and the axial distance L2 is zero. In this case, the bushing 5 may not tilt inside the driving bearing 6, and a minimum oil film thickness between the bushing 5 and the driving bearing 6 can be maintained, so as to avoid contact and wear between the bushing 5 and the driving bearing 6.

Therefore, compared with the scroll compressor 100 of relevant design, the scroll compressor 200 according to the first embodiment of the present application can reduce the overturning moment acting on the bushing 5 by moving the mass center of the counterweight 9 upward, so as to avoid wear caused by the contact between the bushing 5 and the driving bearing 6.

In addition, considering the limitation of the mounting space of the counterweight 9 inside the scroll compressor 200, if the mass center S2 of the counterweight 9 is moved up to above the axial lower end 61 of the driving bearing 6 so that the counterweight 9 is close to the end plate 21 of the orbiting scroll 2, it is required to form sufficient mounting space between the hub portion 2 of the orbiting scroll 2 and the thrust member 7, which generally needs to modify the thrust member 7 at the expense of sacrificing the thrust surface between the orbiting scroll 2 and the thrust member 7.

Therefore, the parameters of counterweight 9 are further reasonably optimized by further considering the wear between the bushing 5 and the driving bearing 6 and the thrust surface between the orbiting scroll 2 and thrust member 7.

As described above, the oil film is formed between the bushing 5 and the driving bearing 6 to lubricate the joint surfaces between the bushing 5 and the driving bearing 6, so as to avoid wear. In a case that the bushing 5 is inclined to a certain extent relative to the driving bearing 6, the wear between the bushing 5 and the driving bearing 6 can be avoided if the minimum oil film thickness between the bushing 5 and the driving bearing 6 can be guaranteed so that the oil film is not damaged.

In a case that the counterweight 9 is designed such that its mass center S2 thereof is further moved upward and close to the dotted line A, it is required to move an inner peripheral surface of the thrust member 7 radially outward. However, the size of an outer periphery of the thrust member 7 cannot be increased accordingly due to the limitation of the mounting space inside the scroll compressor 200, so that the thrust surface between the orbiting scroll 2 and the thrust member 7 may be reduced, which may adversely increase a thrust surface PV value between the orbiting scroll 2 and the thrust member 7, and may easily cause wear on the thrust surface. The thrust surface PV value between the orbiting scroll 2 and the thrust member 7 is the product of the stress (pressure) of the interaction between the orbiting scroll 2 and the thrust member 7 and the relative velocity of the orbiting scroll 2 to the thrust member 7. Generally, the higher the thrust surface PV value is, the easier it is to cause the wear of the thrust surface. If the thrust surface PV value is higher than 320 MPa·m/s, it is considered that the risk of wear of the thrust surface is large. If the mass center S2 of the counterweight 9 is located above the axial center of the driving bearing 6 (above the dotted line A), it means that the thrust surface between the orbiting scroll 2 and the thrust member 7 needs to be further sacrificed, which results in a further increase in the thrust surface PV value between the orbiting scroll 2 and the thrust member 7 and an increase in the risk of wear. In view of this, the counterweight 9 is arranged such that its mass center S2 is located below the axial center (dotted line A) of the driving bearing 6, as shown in FIG. 7.

On the other hand, in a case that the counterweight 9 is designed such that the axial distance L2 between its mass center S2 and the dotted line A is larger, the overturning moment acting on the bushing 5 is larger, and the tilting degree of the bushing 5 inside the driving bearing 6 increases, which increases the risk of damage to the minimum oil film thickness between the bushing 5 and the driving bearing 6, and easily causes contact wear. An oil film specific thickness between the bushing 5 and the driving bearing 6 is used to measure the risk of wear between the bushing 5 and the driving bearing 6. The oil film specific thickness between the bushing 5 and the driving bearing 6 is a ratio of the minimum oil film thickness between the bushing 5 and the driving bearing 6 to a comprehensive roughness of two surfaces (that is, the outer peripheral surface of the bushing 5 and the inner peripheral surface of the driving bearing 6). In the case that the oil film specific thickness is less than 3, it is considered that there may be a great risk of wear between the bushing 5 and the driving bearing 6.

Figure 8:
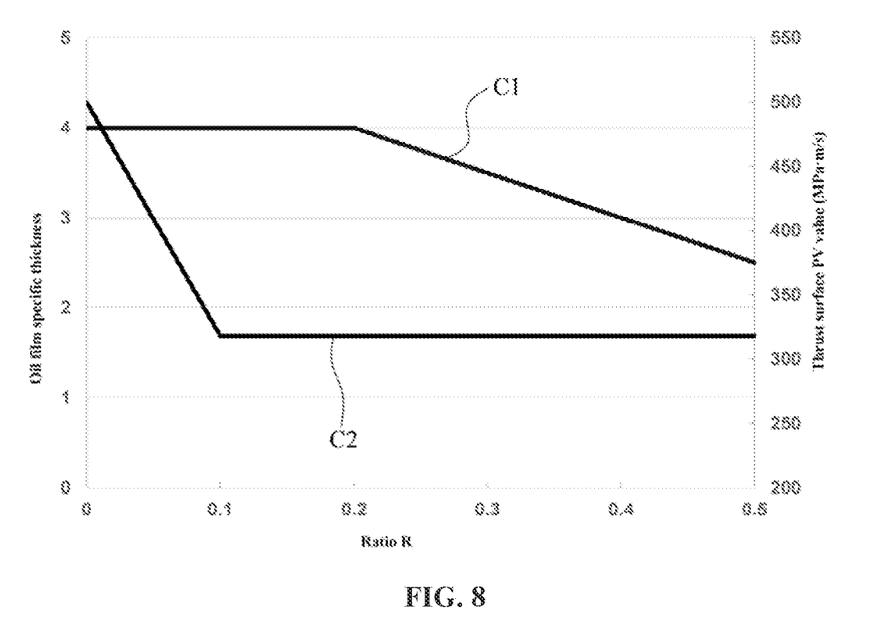
FIG. 8 is a graph showing a relationship among an oil film specific thickness, a thrust surface PV value and a counterweight design.

FIG. 8 is a graph showing a relationship among the oil film specific thickness between the bushing 5 and the driving bearing 6, the ratio R and the thrust surface PV value between the orbiting scroll 2 and the thrust member 7. The ratio R is the ratio of the axial distance L2 between the mass center S2 of the counterweight 9 and the height of the center (dotted line A) of the driving bearing 6 to the axial height L1 of the driving bearing 6, that is, R=L2/L1. The smaller the ratio R is, the closer the mass center S2 of the counterweight 9 is to the height of the axial center of the driving bearing 6 (the closer it is to the dotted line A). The greater the ratio R is, the farther the mass center S2 of the counterweight 9 is from the height of the axial center of the driving bearing 6, and the closer it is to the axial lower end of the driving bearing 6.

In FIG. 8, a curve C1 represents the relationship between the oil film specific thickness between the bushing 5 and the driving bearing 6 and the ratio R, and a curve C2 represents the relationship between the thrust surface PV value between the orbiting scroll 2 and the thrust member 7 and the ratio R. As shown in FIG. 8, in a case that the ratio R is less than 0.1, the oil film specific thickness between the bushing 5 and the driving bearing 6 is 4, and the thrust surface PV value is higher than 318 Mpa·m/s; in a case that the ratio R is greater than 0.4, the oil film specific thickness between the bushing 5 and the driving bearing 6 is less than 3, and the thrust surface PV value is about 318 Mpa·m/s; in a case that the ratio R ranges from 0.1 to 0.2, the oil film specific thickness between the bushing 5 and the driving bearing 6 is 4, and the thrust surface PV value is about 318 Mpa·m/s; in a case that the ratio R ranges from 0.2 to 0.3, the oil film specific thickness between the bushing 5 and the driving bearing 6 is less than 4 and greater than 3.5, and the thrust surface PV value is about 318 Mpa·m/s; and in a case that the ratio R ranges from 0.3 to 0.4, the oil film specific thickness between the bushing 5 and the driving bearing 6 is less than 3.5 and greater than or equal to 3, and the thrust surface PV value is about 318 Mpa·m/s. Therefore, in the case that the ratio R ranges from 0.1 to 0.4, the oil film specific thickness between the bushing 5 and the driving bearing 6 is not less than 3, and the thrust surface PV value is not higher than 320 Mpa·m/s, and both the risk of wear between the bushing 5 and the driving bearing 6 and the risk of wear between the orbiting scroll 2 and the thrust member 7 are small. Therefore, by designing the counterweight 9 such that the above ratio R ranges from 0.1 to 0.4, the problem of wear between the bushing 5 and the driving bearing 6 and wear between the orbiting scroll 2 and the thrust member 7 can be solved. Preferably, the counterweight 9 is designed such that the ratio R ranges from 0.3 to 0.4. More preferably, the ratio R ranges from 0.2 to 0.3. Further preferably, the ratio R ranges from 0.1 to 0.2. For example, the ratio R may be 0.15, 0.25, 0.35 or the like.

The scroll compressor 200 according to the first embodiment of the present application has been described above. In the scroll compressor 200, by designing the counterweight 9 such that its mass center S2 is moved up to above the axial lower end 61 of the driving bearing 6, the bushing 5 and the driving bearing 6 can be prevented from contacting each other and wearing. Further preferably, by designing the counterweight 9 such that the above ratio R ranges from 0.1 to 0.4, the contact wear between the bushing 5 and the driving bearing 6 can be avoided while allowing a certain degree of inclination of the bushing 5 relative to the driving bearing 6, the wear between the moving scroll 2 and the thrust member 7 can also be avoided, the requirements for the machining accuracy and assembly accuracy of the counterweight 9, the bushing 5 and the thrust member 7 can be lowered, and the overall optimization design of the scroll compressor 200 can be realized.

Figure 9:
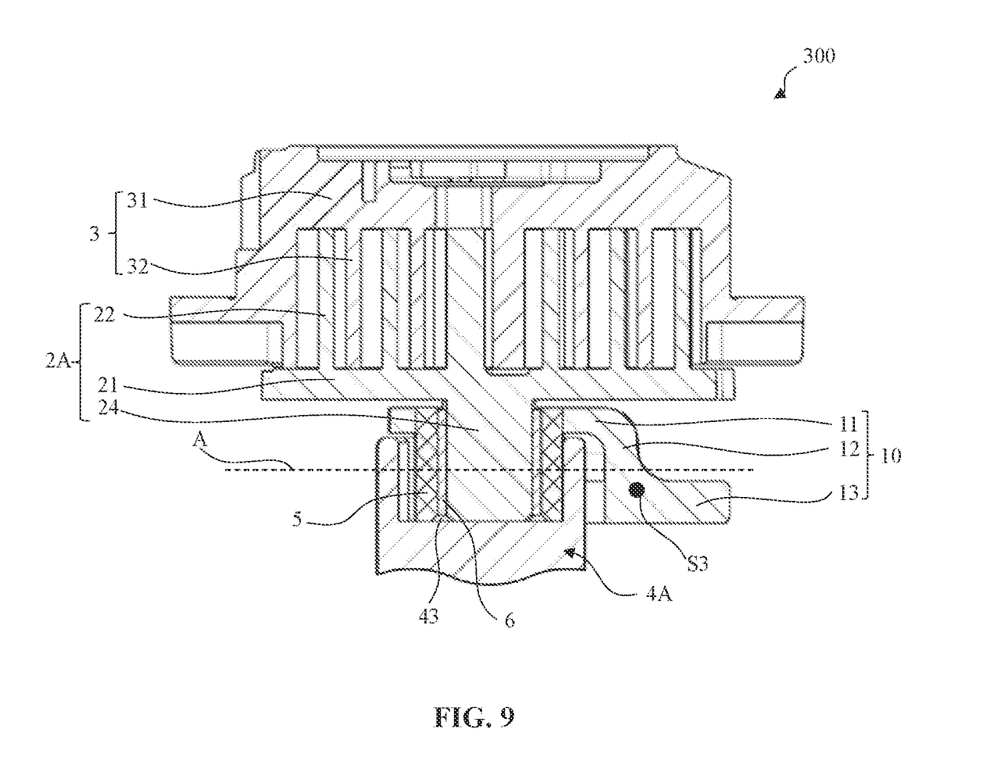
FIG. 9 is a partial cross-sectional view of the scroll compressor according to a second embodiment of the present application.

FIG. 9 is a schematic view of a scroll compressor 300 according to a second embodiment of the present application. A structure of the scroll compressor 300 according to the second embodiment of the present application is substantially the same as that of the scroll compressor 200 according to the first embodiment of the present application except for the design of a coupling portion between the orbiting scroll and the rotating shaft. In the drawings, the same components as those of the scroll compressor 200 are denoted by the same reference numerals, and will not be described again. Only the differences between the scroll compressor 300 according to the second embodiment of the present application and the scroll compressor 200 according to the first embodiment of the present application are described below.

In the scroll compressor 300 according to the second embodiment, an orbiting scroll 2A includes an end plate 21, a scroll 22 which extends from the end plate 21 toward a side (a side where a non-orbiting scroll 3 is located) and a protruding shaft portion 24 which extends from the end plate 21 toward an opposite side (a side where a rotating shaft 4A is located). An extending portion, coupled with an eccentric structure of the rotating shaft 4A, of the orbiting scroll 2A is the protruding shaft portion 24. The eccentric structure of the rotating shaft 4A is an eccentric recess portion 43 located at the top of the rotating shaft 4A. The protruding shaft portion 24 of the orbiting scroll 2A is mounted in the eccentric recess portion 43 of the rotating shaft 4A via the driving bearing 6 and the bushing 5. The bushing 5 may be an unloading bushing, which is driven by the eccentric recess portion 43 and adapted to be displaced relative to the eccentric recess portion 43 to realize radial compliance of the compression mechanism. As shown in FIG. 9, a counterweight 10 is mounted on the bushing 5. The counterweight 10 includes an annular mounting portion 11, a connecting portion 12 and a main counterweight portion 13. The mounting portion 11 is connected with the main counterweight portion 13 by the connecting portion 12. The counterweight 10 has a design substantially similar to the counterweight 9 in the scroll compressor 200. When the counterweight 10 is mounted in place in the scroll compressor 300, the mounting portion 11 is fixedly mounted at an axial upper end of the bushing 5, the main counterweight portion 13 is concentric with the rotating shaft 4A, and a mass center S3 of the counterweight 10 is located above the axial lower end 61 of the driving bearing 6 and is as close to the height of the center (dotted line A) of the driving bearing 6 as possible, and the ratio R of the axial distance between the mass center S3 of the counterweight 10 and the height of the axial center (dotted line A) of the driving bearing 6 to the axial height of the driving bearing 6 also satisfies the above relationship, that is, the ratio R ranges from 0.1 to 0.4. As shown in FIG. 9, the mass center S3 of the counterweight 10 is located below the height of the axial center (dotted line A) of the driving bearing 6. However, if the space between the protruding shaft portion 24 of the orbiting scroll 2A and the thrust member (not shown in FIG. 9) is sufficient, the mass center S3 of the counterweight 10 may also be arranged to be above the height of the axial center of the driving bearing 6.

The scroll compressor 300 according to the second embodiment can realize effects similar to that of the scroll compressor 200 according to the first embodiment of the present application, which can prevent contact wear between the bushing 5 and the driving bearing 6 while allowing the bushing 5 to have a certain degree of inclination, can lower the requirements for manufacturing accuracy and assembly accuracy of the components, and can realize the systemic optimization design of the scroll compressor 300.

The scroll compressor according to the preferred embodiments of the present application has been illustrated above. In the scroll compressor 200 illustrated above, the counterweight 9 includes the mounting portion 91, the connecting portion 92, the main counterweight portion 93 and the auxiliary counterweight portion 94 which are integrated with each other. However, the present application is not limited thereto. According to other embodiment of the present application, the mounting portion 91, the connecting portion 92, the main counterweight portion 93 and the auxiliary counterweight portion 94 may be two or more components which are assembled with each other. For example, the auxiliary counterweight portion 94 may be detachably mounted to the main counterweight portion 93. In another example according to the present application, the counterweight may not be provided with the above auxiliary counterweight portion 94 in a case that the space between the hub portion 23 of the orbiting scroll 2 and the thrust member 7 is limited.

In the scroll compressor 200 and the scroll compressor 300 illustrated above, the counterweight 9 and the counterweight 10 are fixedly mounted on the bushing 5 respectively. However, the present application is not limited thereto, and in other examples according to the present application, the counterweight may be formed integrally with the bushing 5.

The exemplary embodiments of the scroll compressor according to the present application have been described in detail, but it should be understood that the present application is not limited to the specific embodiments described and shown in detail above. Without departing from the spirit and scope of the present application, those skilled in the art can make various modifications and variations to the present application. All the variations and modifications are within the scope of the present application. Moreover, all of the components described herein can be replaced by other technically equivalent components.

The invention claimed is:

1. A scroll compressor, comprising:
a rotating shaft, an end of which is provided with an eccentric structure;
a compression mechanism, comprising a non-orbiting scroll and an orbiting scroll, wherein the orbiting scroll comprises an extending portion which extends from an end plate toward the rotating shaft;
a driving bearing with an axial height L1;
a bushing, wherein the extending portion is coupled with the eccentric structure via the driving bearing and the bushing, so that the rotating shaft is configured to drive the compression mechanism; and
a counterweight arranged on the bushing;
wherein a mass center of the counterweight is located above an axial lower end of the driving bearing, an axial distance from the mass center of the counterweight to an axial center of the driving bearing is L2, and a ratio R of the axial distance L2 to the axial height L1 satisfies: 0.1≤R≤0.4.

2. The scroll compressor according to claim 1, wherein the ratio R satisfies: 0.1≤R≤0.2.

3. The scroll compressor according to claim 1, wherein the counterweight comprises a mounting portion, a main counterweight portion and a connecting portion connecting the mounting portion with the main counterweight portion, and the mounting portion is mounted to the bushing.

4. The scroll compressor according to claim 3, wherein the scroll compressor further comprises a thrust member, the orbiting scroll is supported on the thrust member, and the main counterweight portion is located in a space between the thrust member and the extending portion.

5. The scroll compressor according to claim 4, wherein the eccentric structure is an eccentric crank pin, the extending portion is a hub portion, and the eccentric crank pin is coupled in the hub portion via the bushing and the driving bearing.

6. The scroll compressor according to claim 4, wherein the bushing is an unloading bushing, which is arranged to be driven by the eccentric structure and adapted to be displaced relative to the eccentric structure to realize radial compliance of the compression mechanism.

7. The scroll compressor according to claim 3, wherein the main counterweight portion is in an arc shape concentric with a rotation center of the rotating shaft, and an arc angle of the main counterweight portion ranges from 160° to 180°.

8. The scroll compressor according to claim 3, wherein at least a windward side circumferential end wall of circumferential end walls of the counterweight is inclined in a direction opposite to a rotation direction of the counterweight, to form an inclination angle of less than 90° relative to a central axis of the counterweight.

9. The scroll compressor according to claim 8, wherein the eccentric structure is an eccentric crank pin, the extending portion is a hub portion, and the eccentric crank pin is coupled in the hub portion via the bushing and the driving bearing.

10. The scroll compressor according to claim 8, wherein the bushing is an unloading bushing, which is arranged to be driven by the eccentric structure and adapted to be displaced relative to the eccentric structure to realize radial compliance of the compression mechanism.

11. The scroll compressor according to claim 3, wherein a mass center of the main counterweight portion is located above the axial center of the driving bearing.

12. The scroll compressor according to claim 11, wherein the counterweight further comprises an auxiliary counterweight portion, and the auxiliary counterweight portion is located axially above or radially outside the main counterweight portion.

13. The scroll compressor according to claim 11, wherein the eccentric structure is an eccentric crank pin, the extending portion is a hub portion, and the eccentric crank pin is coupled in the hub portion via the bushing and the driving bearing.

14. The scroll compressor according to claim 11, wherein the bushing is an unloading bushing, which is arranged to be driven by the eccentric structure and adapted to be displaced relative to the eccentric structure to realize radial compliance of the compression mechanism.

15. The scroll compressor according to claim 3, wherein the eccentric structure is an eccentric crank pin, the extending portion is a hub portion, and the eccentric crank pin is coupled in the hub portion via the bushing and the driving bearing.

16. The scroll compressor according to claim 3, wherein the bushing is an unloading bushing, which is arranged to be driven by the eccentric structure and adapted to be displaced relative to the eccentric structure to realize radial compliance of the compression mechanism.

17. The scroll compressor according to claim 3, wherein the eccentric structure is an eccentric recess portion, the extending portion is a protruding shaft portion, and the protruding shaft portion is coupled in the eccentric recess portion via the driving bearing and the bushing.

18. The scroll compressor according to claim 1, wherein the eccentric structure is an eccentric crank pin, the extending portion is a hub portion, and the eccentric crank pin is coupled in the hub portion via the bushing and the driving bearing.

19. The scroll compressor according to claim 1, wherein the bushing is an unloading bushing, which is arranged to be driven by the eccentric structure and adapted to be displaced relative to the eccentric structure to realize radial compliance of the compression mechanism.

20. The scroll compressor according to claim 1, wherein the eccentric structure is an eccentric recess portion, the extending portion is a protruding shaft portion, and the protruding shaft portion is coupled in the eccentric recess portion via the driving bearing and the bushing.

\* \* \* \* \*